(12) United States Patent
Bruins (10) Patent No.: US 9,222,269 B2
(45) Date of Patent: Dec. 29, 2015

(54) REINFORCED COMPOSITE DECKING AND RELATED METHOD OF MANUFACTURE

(71) Applicant: National Nail Corp., Grand Rapids, MI (US)

(72) Inventor: Roger C. Bruins, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 0 days.

(21) Appl. No.: 14/525,963

(22) Filed: Oct. 28, 2014

(65) Prior Publication Data

US 2015/0176290 A1 Jun. 25, 2015

Related U.S. Application Data

(60) Provisional application No. 61/918,314, filed on Dec. 19, 2013.

(51) Int. Cl.
| | | |
|---|---|---|
| *E04C 1/00* | (2006.01) | |
| *E04F 15/10* | (2006.01) | |
| *E04B 5/02* | (2006.01) | |
| *B29C 47/02* | (2006.01) | |
| *B29K 27/06* | (2006.01) | |
| *B29K 105/06* | (2006.01) | |

(52) U.S. Cl.
CPC ............ *E04F 15/105* (2013.01); *B29C 47/025* (2013.01); *E04B 5/026* (2013.01); *B29K 2027/06* (2013.01); *B29K 2105/06* (2013.01)

(58) Field of Classification Search
CPC ........ E04F 15/105; E04B 5/026; E04B 5/023; E04B 5/016; E04C 2/20

USPC .................... 52/309.1, 742.1, 745.05, 745.19
See application file for complete search history.

(56) References Cited

U.S. PATENT DOCUMENTS

| | | | | |
|---|---|---|---|---|
| 4,141,944 | A | * | 2/1979 | Anstadt et al. ................ 264/45.5 |
| 5,089,189 | A | * | 2/1992 | Staneluis et al. ............. 264/45.3 |
| 5,096,645 | A | * | 3/1992 | Fink ................................ 264/137 |
| 5,238,633 | A | * | 8/1993 | Jameson .................. 264/211.23 |
| 5,330,341 | A | * | 7/1994 | Kemerer et al. ............... 425/144 |
| 5,393,536 | A | * | 2/1995 | Brandt et al. .................. 425/112 |
| 5,486,553 | A | * | 1/1996 | Deaner et al. .................... 524/13 |
| 5,545,297 | A | | 8/1996 | Andersen et al. |
| 5,743,986 | A | * | 4/1998 | Colombo .................. 156/244.11 |
| 5,851,609 | A | * | 12/1998 | Baratuci et al. .................. 428/34 |
| 6,226,942 | B1 | * | 5/2001 | Bonin ......................... 52/309.12 |
| 6,344,268 | B1 | * | 2/2002 | Stucky et al. ............... 428/317.9 |
| 6,592,789 | B2 | * | 7/2003 | Barsby .......................... 264/45.9 |
| 6,617,009 | B1 | * | 9/2003 | Chen et al. .................. 428/195.1 |
| 6,844,040 | B2 | | 1/2005 | Pabedinskas et al. |
| 6,927,183 | B1 | * | 8/2005 | Christen ....................... 442/370 |
| 6,972,144 | B2 | | 12/2005 | Roth et al. |

(Continued)

*Primary Examiner* — Joshua J Michener
*Assistant Examiner* — Keith Minter
(74) *Attorney, Agent, or Firm* — Warner Norcross & Judd LLP (57) ABSTRACT

A composite decking board constructed from a thermoplastic polymer material including one or more reinforcing filaments located within and embedded in at least a lower portion of the board to impart and enhance structural stiffness and rigidity. A method is provided in which the board is formed by extruding molten material through a die and continuously feeding reinforcement filament in the molten thermoplastic feed material simultaneously. The reinforcement filament is disposed substantially within the cross section of the extruded board and can generally be disposed in the lower portion of the board.

18 Claims, 5 Drawing Sheets

(56) References Cited

U.S. PATENT DOCUMENTS

| | | | |
|---|---|---|---|
| 7,638,187 B2* | 12/2009 | Nesbitt | 428/292.1 |
| 7,972,546 B1* | 7/2011 | Hughes et al. | 264/148 |
| 8,206,807 B2* | 6/2012 | Friedman et al. | 428/68 |
| 8,733,063 B2* | 5/2014 | Song et al. | 52/745.19 |
| 8,784,587 B2* | 7/2014 | Lindgren et al. | 156/71 |
| 2001/0053820 A1* | 12/2001 | Yeager et al. | 525/186 |
| 2003/0021915 A1* | 1/2003 | Rohatgi et al. | 428/15 |
| 2003/0030176 A1* | 2/2003 | Monovoukas et al. | 264/211 |
| 2003/0082338 A1* | 5/2003 | Baker | 428/114 |
| 2004/0048055 A1* | 3/2004 | Branca | 428/297.4 |
| 2004/0062915 A1 | 4/2004 | Pabedinskas et al. | |
| 2004/0080071 A1 | 4/2004 | Jo et al. | |
| 2004/0081797 A1* | 4/2004 | Simmons et al. | 428/137 |
| 2004/0126515 A1* | 7/2004 | Yarmoska | 428/34.1 |
| 2004/0224141 A1 | 11/2004 | Seiling | |
| 2006/0144014 A1* | 7/2006 | Yoon et al. | 52/784.1 |
| 2006/0186571 A1* | 8/2006 | Brown | 264/166 |
| 2007/0126142 A1* | 6/2007 | Zhou et al. | 264/134 |
| 2007/0289224 A1* | 12/2007 | Parmley | 52/21 |
| 2008/0010924 A1* | 1/2008 | Pietruczynik et al. | 52/309.1 |
| 2008/0145637 A1* | 6/2008 | Frank | 428/292.4 |
| 2008/0182074 A1* | 7/2008 | Pasquale et al. | 428/159 |
| 2008/0193740 A1* | 8/2008 | Nesbitt | 428/318.4 |
| 2012/0017528 A1* | 1/2012 | Liu | 52/309.1 |
| 2012/0048487 A1* | 3/2012 | Brewster et al. | 160/368.1 |
| 2012/0073225 A1* | 3/2012 | Douglass | 52/309.4 |
| 2013/0025228 A1* | 1/2013 | Kilgore et al. | 52/578 |
| 2013/0025230 A1* | 1/2013 | Turner | 52/586.1 |
| 2013/0136877 A1* | 5/2013 | Nelson et al. | 428/34.5 |
| 2013/0183482 A1* | 7/2013 | Hannen | 428/98 |
| 2014/0065341 A1* | 3/2014 | Sutton et al. | 428/54 |
| 2014/0260028 A1* | 9/2014 | Tuttle et al. | 52/309.1 |
| 2015/0044377 A1* | 2/2015 | Tibor et al. | 427/358 |

* cited by examiner

REINFORCED COMPOSITE DECKING AND RELATED METHOD OF MANUFACTURE

BACKGROUND OF THE INVENTION

The present invention relates to composite decking, and more particularly to composite decking coextruded with continuous reinforcing strands that improve the structural characteristics of the decking.

Decks, docks, and other platform-like structures typically are constructed from wood, particularly in North America. Generally, both the decking surface and underlying joists or other support structures are constructed from wood. Many times, wood will split, warp, twist, splinter and/or rot due to exposure to the environment, and particularly to moisture. These issues become even more problematic on upper decking surfaces where water can collect.

To address the issues with wood decking, several manufacturers now offer decking materials constructed from composite materials, which can include thermoplastic resins and in some cases cellulosic fillers. These decking materials typically are formed as elongated boards. The boards are constructed by extruding composite materials through a high pressure extruder. The resultant composite boards are more resistant to warping, splitting and splintering than conventional wood boards.

An issue with composite boards, however, is that while weight is reduced, these boards typically have a stiffness, when measured by the flexural modulus, that may be only 10%-50% of that of wood. Accordingly, composite boards used in a decking application, typically must be substantially larger than corresponding wood boards that they are designed to replace. Alternatively, the spans between underlying structures, such as joists must be significantly reduced to accommodate the less stiff composite boards. As a result, more materials and time must be used to produce a sturdy, supportive substructure when using conventional composite boards.

There remains room for improvement in the field of composite decking, particularly in relation to improving the stiffness and tension characteristics of composite boards.

SUMMARY OF THE INVENTION

A composite decking board is provided, where the board is formed via an extrusion process with one or more reinforcement filaments being located and embedded in the composite board to impart enhanced structural stiffness and rigidity to it.

In one embodiment, the composite decking board includes an end or a cross section taken perpendicular to a length of the board. The cross section can be polygonal, and optionally substantially rectangular. The cross section can include a centerline located midway between an upper surface and lower surface of the composite decking board. The centerline can divide the end or cross section into an upper portion and a lower portion.

In another embodiment, reinforcement filaments can be embedded and encapsulated in the composite decking board, within the cross section, with the reinforcement filaments being located substantially only in the lower portion of the board. There, the filaments optionally can function to provide enhanced tensile strength of the board. Accordingly, when subjected to loads, the composite decking board yields or flexes less between underlying support structures. Further optionally, the filaments in the board can accommodate a substantial portion of the stress imparted to the lower portion of the composite decking board to reduce buckling or bending of the board between underlying support structures.

In still another embodiment, the composite decking board is constructed from a thermoplastic polymer material. This material can comprise polyvinyl chloride (PVC), high density polyethylene (HDPE), polypropylene (PP), wood-plastic composite mixtures thereof, and/or other similar polymeric materials.

In yet another embodiment, a method of manufacturing the composite decking board is provided. The method can include extruding a molten thermoplastic polymer feed material under pressure through an extrusion die. The molten thermoplastic polymer feed material can form and attain a shape of an extruded board. The board can have a generally rectangular or polygonal cross section. One or more reinforcement filaments can be continuously placed in the molten thermoplastic feed material, while in its molten or flowable state, as the feed material is extruded through the die to form the extruded board. The reinforcement filament is disposed substantially entirely within the rectangular cross section of the extruded board.

In even another embodiment, the method can include continuously placing the reinforcement filaments substantially only in the lower portion of the extruded board simultaneously while the board is being extruded, and while the thermoplastic polymer feed material is in its molten or flowable state.

In still even another embodiment, the method can include aligning the reinforcement filaments in one or more planes extending through the cross section or end with the filaments extending substantially parallel to one another through a length of the board.

In a further embodiment, the method can include adding an indicia element to at least one of an upper and lower surface of the board. The indicia element can indicate to an installer which surface is to face upward, and which is to face downward, to ensure that the reinforcement filaments provide maximum tensile strength to the board. For example, the lower surface can include an indicia element in the form of text "This side down." When the installer installs the board according to the indicia element, the reinforcement filaments can be located on the "bottom" of the board, substantially in the lower portion of the board, to handle stress loads imparted on the board in use.

The current embodiments provide an extruded composite decking board exhibiting enhanced strength and functionality, optionally without dimensions that significantly exceed those of counterpart wood decking boards. The method of manufacture provides an efficient way to incorporate reinforcement filaments into preselected portion of the board in an extrusion process. This can lead to decreased material waste and improved time to form the composite decking boards.

These and other objects, advantages, and features of the invention will be more fully understood and appreciated by reference to the description of the current embodiment and the drawings.

Before the embodiments are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
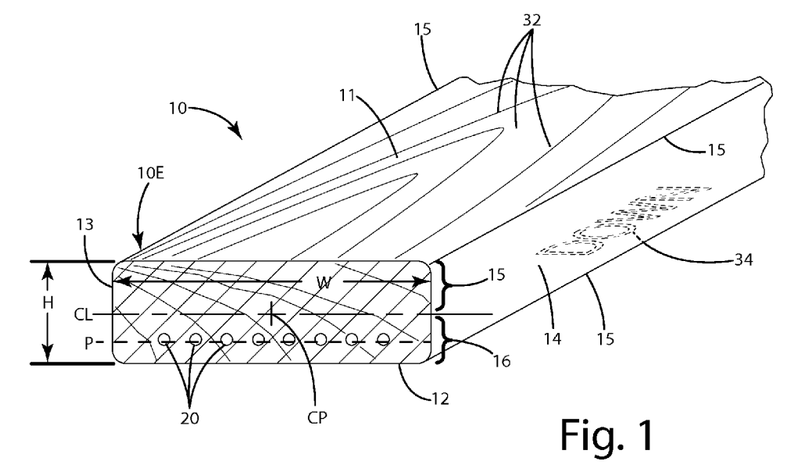
FIG. 1 is a perspective end view of a composite decking board of a current embodiment.
Figure 2:
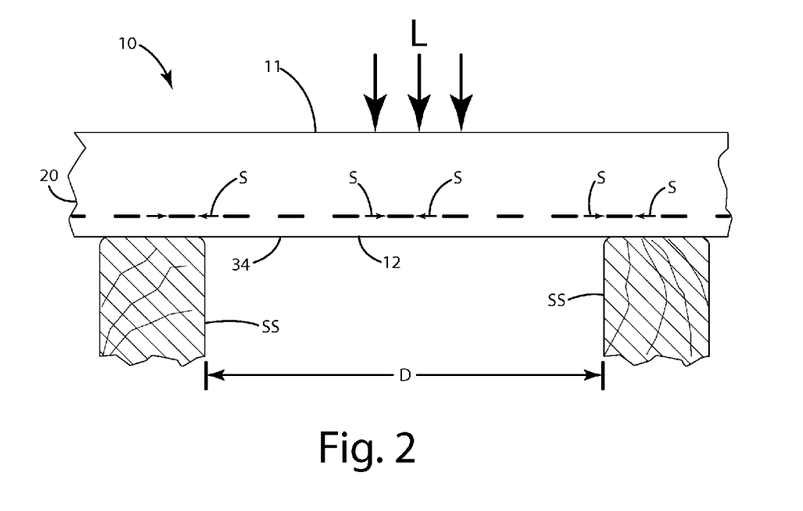
FIG. 2 is a side view of the composite decking board under a load.

A composite decking board according to a current embodiment is illustrated in FIGS. 1-2 and generally designated 10. The composite decking board, also referred to as "board" herein can be used in constructing decks, docks, and other similar platform like structures. Generally, the board 10 in its final form is significantly longer than it is wide. Thus the board is generally not considered a "sheet," although in certain applications, the current embodiments could be utilized in conjunction with sheets.

The board 10 can be of a polygonal, and more particularly, a rectangular or square construction as shown in FIG. 1. There, the cross section illustrated at the end 10E of the board is rectangular, but of course other cross sections can be selected. The rectangular cross section includes a width W and a height H. The width and height can be selected depending on the particular application and construction of the board for the application. For most construction activities in North America, the composite decking boards can have heights and widths corresponding to nominal dimensional lumber sizes. For example, the height H and width W respectively can be of the of the following nominal dimensions (H×W): 1"×2", 1"×3", 1"×4", 1"×5", 1"×8", 1"×10", 1"×12", 2"×2", 2"×3", 2"×4", 2"×6", 2"×8", 2"×10", and 2"×12". Of course, the actual dimensions (H×W) of the foregoing can be ¾"×1½", ¾"×2½", ¾"×3½", ¾"×5½", ¾"×7½", ¾"×9¼", ¾"×11¼", 1½"×1½", 1½"×2½", 1½"×3½", 1½"×5½", 1½"×7½", 1½"×9¼", 1½"×11¼", respectively. Further, the height and width of the composite decking boards can be modified from the above dimensions as desired.

The composite decking board can be constructed from a variety of polymers, for example, thermoplastic polymer material. One thermoplastic polymer of the current embodiment is polyvinylchloride (PVC). The PVC can comprise optionally about 10% to about 98% by weight of the board; further optionally about 65% to 95% by weight of the board; and even further optionally at least about 75% by weight of the board. Other polymeric materials which can be used in addition to or as a substitute for the PVC can include high density polyethylene (HDPE), polypropylene (PP), and/or wood-plastic composite mixtures.

Optionally, the composite decking, and in particular the thermoplastic polymer, can include or have enclosed therewithin foams and/or fillers. As an example, cellulose material such as wood powder flakes and fibers, hemp, corn cobs and other fibrous materials can be included in a thermoplastic polymer material. Other fillers such as glass, fly ash, ceramic particles, carbon black, graphite and/or carbon fibers can be included and/or mixed therewithin. Other polymers such as polyesters, polyurethanes, aramid resins, acetyl resins, formaldehyde resins can be included as well in some applications. Copolymers and homopolymers, such as interpolymers, graph copolymers and black copolymers can be used. The thermoplastic polymer material optionally can be void of and not include any type of aggregates such as sand, dolomite, gravel, rock, bauxite, granite, mica, clay, silica fumes and other unreactive cement particles or other geologic materials. Further optionally, the boards can be void of any cementitious material, plasters, or other hydrologically settable material that contains or includes water in any significant amount, that is, greater than about optionally 20%, further optionally greater than 10%, by weight of such material when initially forming a structure.

Other additives, such as colorants, can be added to the thermoplastic polymer so that the resultant composite decking board has a particular color, for example, brown, black, red, green, white, blue or other colors as desired. The color additive can be added to the thermoplastic polymer before, during and/or after extrusion.

If desired, the thermoplastic polymer material can be enhanced with UV protectants and/or coatings that protect the board from basic substances. In some cases the board can be coated with other polymer layers, laminates or waxes. The coatings or other elements can be applied by spraying, dipping, rolling on the respective material.

As shown in FIG. 1, the board 10 can include an upper surface 11 and opposite lower surface 12. These surfaces can be joined by the side surfaces 13 and 14. At the interface and/or transition between the upper and lower surfaces and the respective side surfaces, corners 15 can be formed. The corners can be gently rounded and can include a radius to ensure a smooth transition from the side surfaces to the respective upper and lower surfaces. The corner radius can be optionally about ⅛" to about 2", further optionally ¼" to about 1", and even further optionally about ½". Other radii may be selected for the corners. Further, the surfaces at the corners can meet at right angles or other angles if desired rather than or in addition to being rounded, depending on the application.

The board as shown in FIG. 1 also can include a wood grain 32 which can be incorporated into one or more of the surfaces of the board before, during and/or after extrusion. The wood grain can generally simulate natural wood. The board 10 optionally can include an indicia element 34. This indicia element can be generally disposed on an upper or lower surface of the board, or other surfaces depending on the application. As illustrated, the indicia element 34 is in the form of text. This indicia element can indicate to an installer which surface 11 or 12 of the board to face downward toward a support structure SS as shown in FIG. 2. In turn, this instruction can properly position the reinforcement filaments 20 where they function best, for example, where they take up and resist tensile stress that would otherwise be applied only to the other material of the board.

Where the reinforcement filaments 20 are disposed in a particular portion of the board, the board can exhibit enhanced tensile strength with those filaments placed on the lowermost or underside of the board and closest to the support structures. For example, as shown in FIG. 2 where a load L is placed on the board 10, that load and the resultant stress within the board 11 is transferred to the reinforcement filaments 20. The reinforcement filaments 20 thus resist the stress S presented within those filaments. In turn, the filaments 20 prevent or impair the board 10 from substantially deforming and buckling or bending between the respective support structures SS. In turn, this can impair or prevent the uncomfortable feel of the board bending under a user or object when the support structures are spaced a fair distance D from one another. With these reinforcement filaments 20, the board can also span larger distances D between support structures. In some cases, the composite decking boards of the current embodiments can span between support structures placed a distance of 16" or 24", and in some cases greater distances, depending on the particular reinforcement structure and configuration of the boards. This can be done without a significant increase, if any, in the overall dimensions of height and width of the board over that of normal lumber dimensions.

Returning to FIG. 1, the cross section or end of the board 10 generally can be separated into upper 15 and lower 16 portions via the center line CL. The center line CL can be located half-way or midway between the upper surface 11 and the lower surface 12. Optionally the center line CL can be disposed within a plane that bisects the board into equal sized upper and lower portions 15 and 16. Further optionally, the center line CL and any associated plane can be located a distance that is half the height H from the lower surface 12 or similarly a distance that is half the height H from the upper surface 11. The center line can generally extend through a center point CP of the board 10 as well if desired.

As also shown in FIG. 1, the reinforcing filaments 20 can be located generally below the center line CL or some other reference plane in the board. As an example, the reinforcement filaments 20 can be located in the lower portion 16, and substantially only in that lower portion 16, of the board 10. Thus, the reinforcing filaments are located in the "bottom" of the board when the board 10 is properly installed and placed on support structures SS as shown in FIG. 2. These reinforcement filaments can handle the majority of stress S transmitted thereto from a load L placed on the upper surface 11 of the board 10. Optionally, by placing the reinforcement filaments 20 substantially only in the lower portion 16 or some other portion below the center line CL or other reference plane, additional reinforcement filaments can be absent from the upper portion 15 of the board. In other words, the upper portion 15 can be void of any reinforcement filaments. In such construction, the filaments can be efficiently placed and need not be duplicated in upper and lower portions of the board. Of course, in certain applications, if it is desired to include the reinforcement filaments in both the upper portion and the lower portion of the board, this can be done.

In FIGS. 1 and 2, the reinforcement filaments 20 are disposed generally in a common plane P. This plane P can extend laterally across the cross section of the board and can be substantially parallel to the upper and/or lower surfaces of the board 10, and likewise perpendicular or at an angle relative to the side surfaces 13 and 14 of the board. In the plane P, the reinforcement filaments 20 can be substantially parallel to one another, running the length of the board. Optionally, the filaments can be crisscrossed with one another in certain applications. Generally, the filaments can be configured so that they are not in a wound orientation relative to one another. That is, they do not generally wind about one another in a helical fashion. In some applications, however, such a helical winding can be implemented if desired.

Although shown in a single plane P, the reinforcement filaments 20 can be reproduced or placed in multiple planes P, one above the other. These multiple planes P can be located substantially only in the lower portion 16 of the board 10. Optionally, in some constructions, the reinforcement filaments 20 can be placed in multiple planes that are in both the upper portion and the lower portion. There may however be more planes of reinforcement filaments 20 in the lower portion, so that the lower portion provides greater tensile strength to the board under a load.

The filaments used herein can generally be individual continuous fibers or continuous assemblies of either discontinuous or continuous fibers introduced into the thermoplastic polymer material during extrusion of a board. The term "filaments", "continuous filaments", or "continuous fibers" as used herein all encompass the above definition. Filaments, however, are to be distinguished from discontinuous or chopped fibers, which can be mixed into the thermoplastic polymer material and which generally have a random orientation.

With the reinforcement filaments placed within, encapsulated by and embedded within the thermoplastic feed material, this anchors those filaments over a substantially significant distance. Such filaments within the thermoplastic polymer material can substantially increase the tensile, flexural, or circumferential strengths of the composite decking board. The filaments placed within the board also tend to increase the toughness and elongation ability of the board. Optionally, the filaments can be selected to include sufficient tensile and sheer strengths to independently contribute to the strength of the composite decking board. Further optionally, the filaments are mechanically and chemically anchored within the board. Thus, the filaments are anchored within substantial lengths of the board, which makes it difficult for the filaments to be dislodged or "pulled out."

A variety of filaments are suitable for use in the composite decking board. Such filaments include inorganic fibers and organic fibers. Further specific examples include fiberglass, polyaramid fibers, graphite fibers, carbon fibers, polyethylene fibers or other organic fibers. Fiberglass can be used due to its low cost, good impact properties, and moderate strength and modulus. Polyaramid fibers, such as Kevlar®, which have a very specific strength and modulus, can also be used. Alternatively, the filaments can be constructed from natural or organic fibers such as jute, hemp and/or cotton. While these fibers have relatively low tensile strength, they are typically less costly than polyaramid, graphite or fiberglass fibers. Optionally, a combination of two or more different types of reinforcement filaments can be used to obtain a resulting product that maximizes several characteristics, such as high tensile strength and high elasticity.

The reinforcement filaments are generally illustrated as cords or elongated strings. Of course, these filaments can have a width or thickness corresponding to the desired strength, length, thickness or other properties of the extruded composite decking board. The reinforcing filaments can be disposed within the thermoplastic material during extrusion as an individual filament or as a continuous assembly of continuous or discontinuous fibers. Other assemblies, such as strands, which are assemblies of untwisted fibers, yarns, which are assemblies of twisted filaments, and/or a roving, which is a collection of bundles of filaments, either as untwisted strands or as twisted yarns, can be utilized. Alternatively a mat, which is a sheet of filaments, can be implemented and introduced into the extruded thermoplastic polymer material.

The volume and number of reinforcing filaments continuously fed or placed within the thermoplastic polymer material can vary depending on the desired strength, toughness, flexibility and cost of the final board. The volume and/or weight of the filament in a finished composite decking board can be in the range of optionally about 0.1% to about 25%, further optionally about 1% to about 20%, and even further optionally about 1% to about 10% of the volume and/or total weight of the finished board.

Optionally, the reinforcement filaments can be placed within the thermoplastic polymer material when it becomes molten as it travels through an extrusion die to form an extruded board. The filaments can be placed parallel to each other and can extend within the board within an axis that is the same as the extrusion direction.

Generally as shown in FIGS. 1 and 2, the board 10 can be of a constant unitary cross section which includes no voids or holes. Thus, the board can be solid without any discontinuities (other than the reinforcement filaments) or voids located within the boundaries created by the upper surface, lower surface, and side surfaces. Of course, in some configurations a void or hole can be defined within the board, depending on the application. In this manner, the board can be in the shape of a tube. Alternatively, the board can include multiple cavities side-by-side one another across the width of the board, and can be at least partially hollow for weight savings.

The composite decking board 10 of the current embodiment and its manufacture will now be described with reference to FIGS. 3-5. Generally, the composite decking board 10 is constructed via an extrusion process. To implement the extrusion, reference is made to the extruder 40 in FIG. 3. The extruder 40 can include a hopper 42 within which thermoplastic polymer feed material 50 is placed. The feed material can be in the form of small particles, pellets or in a powder form generally collectively referred to as particulate from herein, depending on the particular polymer and desired extrusion rate and other parameters. Optionally, before or as the thermoplastic polymer material is fed into the hopper, it can be mixed with other materials such as the fillers, colorants, preservatives and other materials noted above.

The hopper 42 feeds the thermoplastic polymer feed material, in its particulate form into the interior chamber 43. Within this interior chamber an auger 44 is disposed. The auger 44, in the form of a rotating screw, exerts a forward pressure on and advances the thermoplastic polymer feed material into a die 60. The screw auger 44 advances the feed material continuously toward the die under extremely high pressure. As the feed material enters the die and passes through the die, it heats and changes state from solid to liquid, and becomes a molten flowable material. Generally, after it becomes molten, it is referred to as a molten thermoplastic polymer feed material, or molten feed material. In general, within extrusion process of the current embodiment, raw material in particulate or solid form is heated or put under sufficient pressure to melt it so that it becomes molten and flowable.

Figure 3:
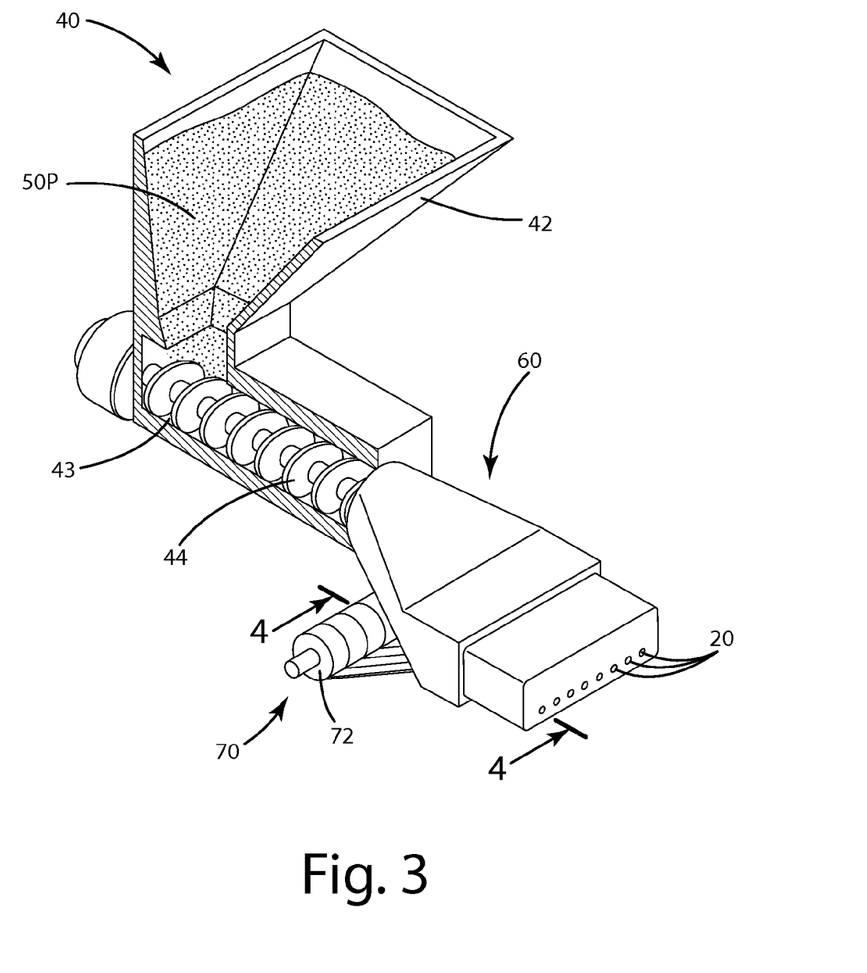
FIG. 3 is a perspective view of an extruder for use in manufacturing the composite decking board.
Figure 4:
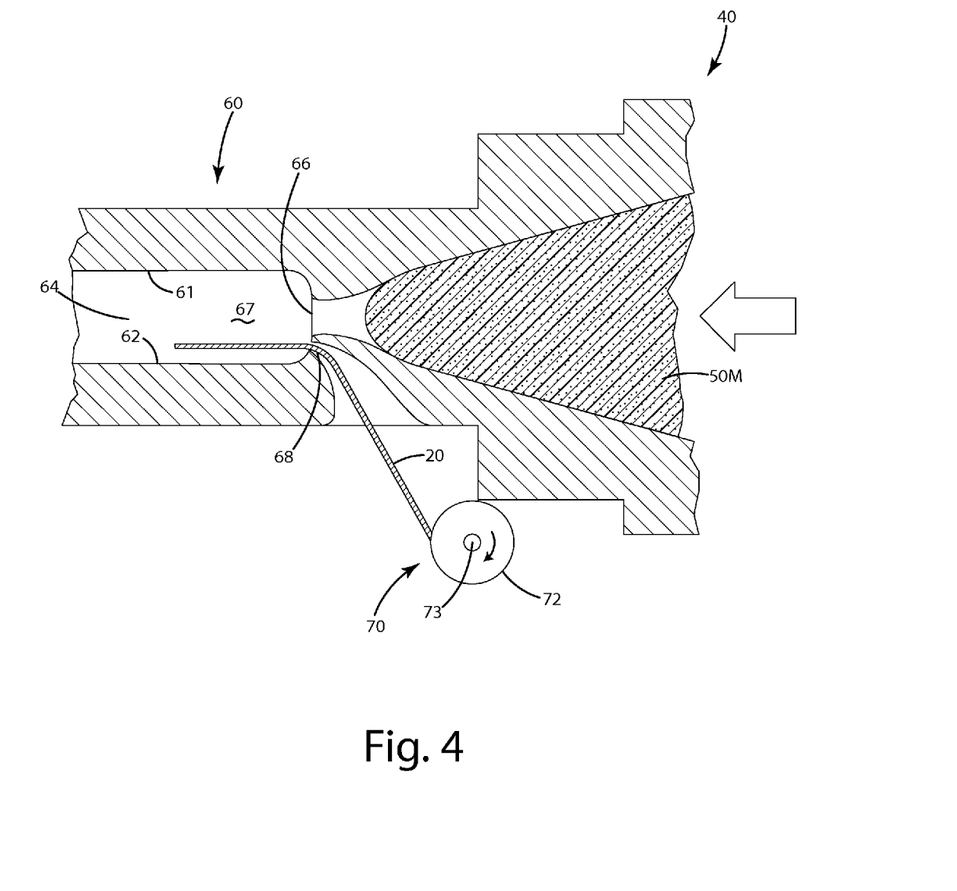
FIG. 4 is a side section view of material being fed into a die according to a method of the current embodiment taken along lines 4-4 of FIG. 3.

Turning now to FIGS. 3 and 4, the die 60 generally includes an opening 66 that opens to a die forming chamber 67. After the feed material has melted and is in a molten form 50M, that material is forced and generally flows through the opening 66 into the chamber 67.

The chamber 67 of the die 60 is defined by one or more walls and includes a longitudinal axis LA. The walls can correspond to and form the different surfaces of the board. For example, the upper wall 61 can correspond to the upper surface 11 of the board. The lower wall or lower surface 62 can conform to and correspond to the lower surface 12 of the board. The side wall 64 of the die, particularly the chamber 67, can correspond to the side wall 14 or 13 of the board 10. As the molten feed material 50M feeds into the chamber 67, the molten plastic feed material extrudes through the die, and particularly the chamber, to form the extruded board 10. Optionally, the molten plastic feed material extrudes in a direction generally parallel to the longitudinal axis LA.

The extruder die 60 also can be configured to continuously place or insert one or more reinforcement filaments within the molten thermoplastic polymer feed material as the thermoplastic polymer feed material is extruded through a die to form the extruded board. To do so, the die 60 can be outfitted with a filament feeder assembly 70. The die 60 can further include an opening 68 which opens directly to the chamber 67. The opening 68 can enable one or more reinforcement filaments 20 to extend into the die, through the opening 68 and into the chamber 67 continuously.

Within the feeder assembly 70, the filaments 20 can be wound upon a spool or reel 72. The spool or reel can rotate in the direction of the arrow shown in FIG. 4 about an axis 73. The spool 72 can be calibrated or controlled to feed the filament 20 at a preselected rate into the chamber 67 as the molten material 50M travels through that chamber 67. Optionally, the spool 72 can be constructed so that it unwinds the filament 20 with the filaments entering through the opening 68 at a rate that matches the advancement of the extruded molten material 50M through the chamber 67. If the desired, the spool 72 can include a motor and can be electronically controlled to provide a precise feed rate of the filament 20.

Figure 5:
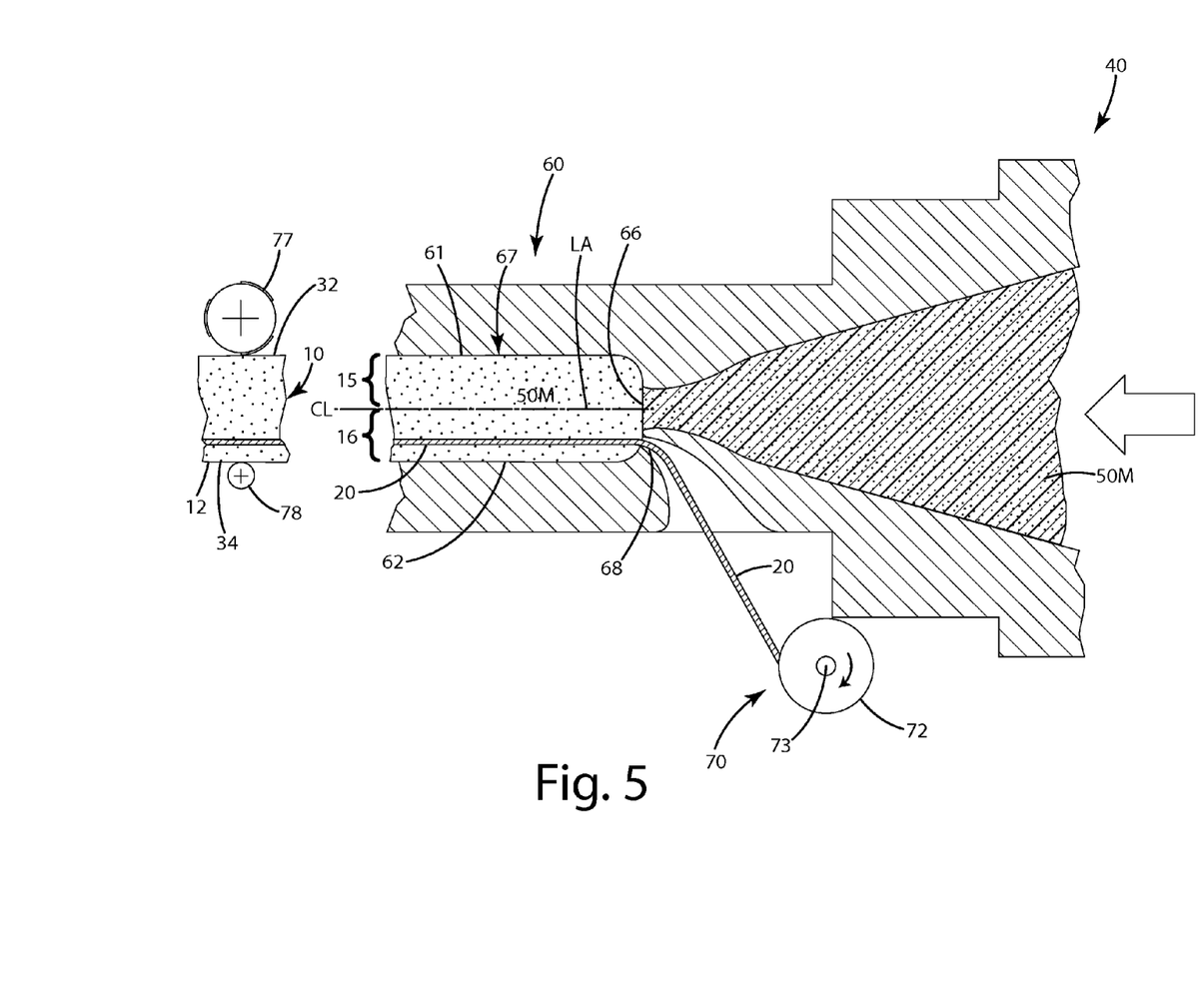
FIG. 5 is a side section view of the composite decking board being extruded in the die according to the method of the current embodiment taken along lines 4-4 of FIG. 3.

As shown in FIG. 5, as the molten material 50M is extruded through the die chamber to form the extruded board, the reinforcement filament 20 is embedded within and encapsulated within the molten thermoplastic material. In this manner, the molten thermoplastic material also can become partially embedded within and bond both chemically and/or mechanically to each individual reinforcement filament. The mechanical and chemical interface between the filaments and the molten thermoplastic polymer feed material assists in securely anchoring the filaments within that material, so that the filaments generally do not slide or move relative to the thermoplastic material of the board.

Generally, the filaments are fed in a parallel configuration, with the filaments generally coaxial to the longitudinal axis or extrusion direction of the board. In certain constructions, however, the filaments can be fed to promote a crisscross configuration or some other configuration as the application dictates. By varying the number of reinforcement filaments placed within the molten material, a variety of different strengths, elongation and toughness properties can be achieved. Optionally, depending on their chemical and structural configuration, the filaments themselves can have greatly varying tensile and sheer strengths, as well as flexibility and elongation characteristics. These properties can be altered by changing the diameter of the filaments or winding or twisting groups or strands of filaments together to form a single filament unit. If desired, the opening 68 can be constructed so that the filament 20 is fed into the molten 50M feed material in a wound form so that it forms a helical configuration within the board.

As further illustrated in FIG. 5, in the current embodiment, the reinforcement filaments 20 are placed continuously substantially only in the lower portion 16 of the board. This lower portion is again located below the centerline CL or some other reference plane. As an example, the plane P within which the filaments 20 are disposed can be located within the vertical space that is equal to or less than 0.1, 0.25, 0.5, 0.75, 1.0 or more inches from the lower surface 12 of the extruded board. Of course other distances can be selected as desired. The continuous filaments can be fed and lay within one or more planes as described above.

The extruder also can include the wood grain simulator roller 77, as shown in FIG. 5. This can exert a pressure atop the extruded board 10 after it exits the extrusion die 60. With this device, which can generally be in the form of a roller, a simulated wood grain can be imparted into the upper surface of the extruded board. Of course, the wood grain imprinter can be disposed on multiple sides of the board and/or the lower surfaces and can impart the wood grain to any of those surfaces.

Where an indicia element is desired on the board 10, as shown in FIG. 5, a roller or other application element 78 can be brought into contact with the lower surface 12 of the board to apply the indicia element 34. The indicia element 34 can be imprinted or embossed within the surface directly. Optionally, the indicia element is formed as one or more indentations or recesses within the surface of the board. Additionally, the indicia element can be painted or inked or printed on the surface. If desired, the indicia element can be placed in or on any other surface of the board, such as the upper surface and/or sides.

Figure 6:
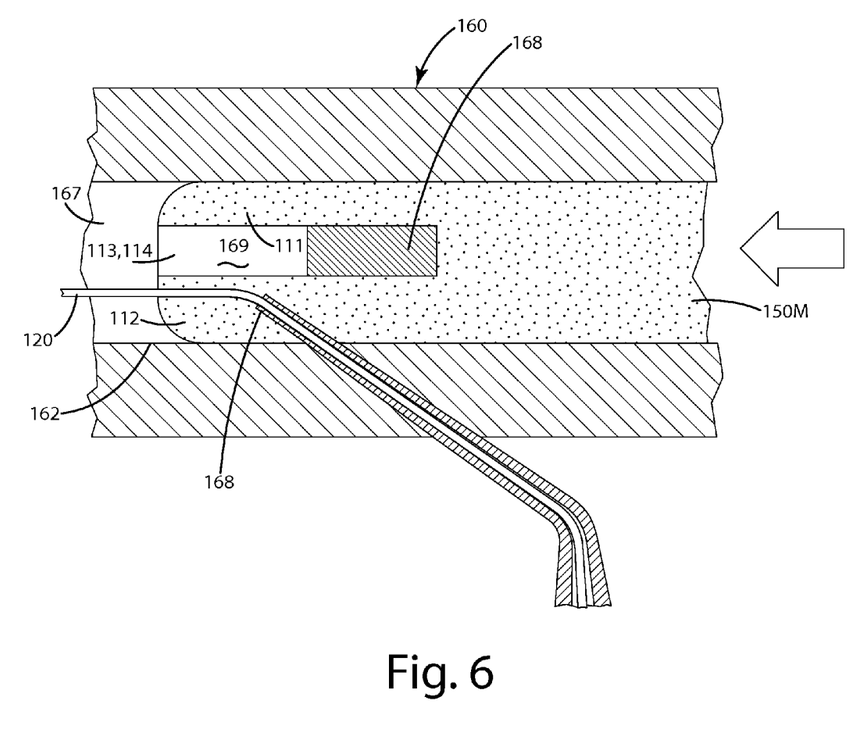
FIG. 6 is a side section view of the composite decking board being extruded in the die according to a method of a first alternative embodiment.

A first alternative embodiment of the die and method above is illustrated in FIG. 6. There, a die 60 includes an internal die chamber 67. Molten material 150M is fed 167. The reinforcement filaments 120, however, are fed into the chamber 167 via a feeder tube 168 that extends upwardly into the chamber 167, generally beyond the lower surface 162 of the chamber 167. In this manner, after the molten material 150M passes the feeder tube 168, the molten material 150M closes around a potential gap formed therein by that tube, thereby closing it off. Optionally, the die 160 can also include an obstruction portion 168. This obstruction portion can be disposed in the pathway of the extruded molten material 150M. As shown this obstruction forms a hollow opening 169 in the extruded molten material. This hollow opening can be defined in the finished cross-section of the board and can generally reduce the weight of the board. The hollow opening can be surrounded by an upper wall 111, a lower wall 112 and one or more side walls 113, 114 in the finished board. Thus, the extruded board can be outfitted so that it is hollow, includes a longitudinal void, or generally is of a tube configuration with an opening extending through its length.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method for extruding a board comprising:
   providing an extrusion die having a longitudinal axis and an interior, the interior having an opening disposed adjacent thereto, an upper surface, a lower surface and opposing sidewalls;
   providing a feeder adjacent the opening to the interior of the die, the feeder adapted to feed a supply of continuous filaments;
   feeding thermoplastic polymer feed material into the die continuously so that the thermoplastic polymer feed material becomes molten;
   extruding the molten thermoplastic polymer feed material under pressure through the die, so that the molten thermoplastic polymer feed material attains a shape of an extruded board corresponding to the upper surface, lower surface and opposing sidewalls of the die, the extruded board having a cross section, with a centerline that is located midway between an upper surface of the extruded board and a lower surface of the extruded board, the centerline dividing the cross section into an upper portion and a lower portion;
   continuously placing a reinforcement filament within the molten thermoplastic polymer feed material as the thermoplastic polymer feed material is extruded through the die to form the extruded board, the reinforcement filament being placed only in the lower portion of the extruded board simultaneously while the board is being extruded.

2. The method of claim 1 comprising imparting a simulated wood grain into at least one of the upper surface and the lower surface of the extruded board.

3. The method of claim 2 wherein the thermoplastic polymer feed material is polyvinyl chloride.

4. The method of claim 3 wherein the thermoplastic polymer feed material is in particulate form, comprising exerting sufficient pressure to the particulate feed material so that the particulate feed material melts and becomes molten and flowable.

5. The method of claim 2 wherein the reinforcement filament includes a plurality of filaments, comprising locating the plurality of filaments in a plane disposed in the lower portion of the extruded board.

6. The method of claim 5 comprising feeding the plurality of filaments so that the plurality of filaments are substantially parallel to one another along the length of the extruded board, and wherein the plane is disposed within a vertical space that is equal to or less than 0.5 inches from the lower surface of the extruded board.

7. The method of claim 5 comprising feeding the plurality of filaments so that the plurality of filaments are substantially parallel to one another along the length of the extruded board, and wherein the plane is disposed within a vertical space that is equal to or less than 1 inches from the lower surface of the extruded board.

8. The method of claim 6 comprising extruding the thermoplastic polymer feed material so that the extruded board cross section is rectangular in shape, and includes a first side surface and an opposing second side surface, the first and second side surfaces transitioning to the upper surface and the lower surface at respective upper corners and respective lower corners.

9. The method of claim 6 comprising forming the corners so that they have a radius of about 0.25 inch to about 1 inch.

10. The method of claim 1 comprising adding an indicia element to at least one surface of the extruded board.

11. The method of claim 1 wherein the filament is placed so that the filament is substantially parallel to the longitudinal axis of the die.

12. The method of claim 1 comprising completely encapsulating the reinforcement filament within the molten thermoplastic feed material as the feed material is extruded through the die to form the extruded board.

13. The method of claim 1 comprising winding the reinforcement filament with another filament and continuously placing the reinforcement filament and other filament in a wound form in the molten thermoplastic feed material.

14. A method for extruding a board comprising:
extruding a molten thermoplastic polymer feed material under pressure through an extrusion die so that the molten thermoplastic polymer feed material forms an extruded board having a rectangular cross section;
forming a hollow opening in the rectangular cross section to reduce a weight of the extruded board, the hollow opening being surrounded by an upper wall, a lower wall and sidewalls extending therebetween; and
continuously placing a reinforcement filament within the molten thermoplastic feed material as the feed material is extruded through the die to form the extruded board, so that the reinforcement filament is disposed substantially only in one of the upper wall or the lower wall and entirely within the rectangular cross section of the extruded board.

15. The method of claim 14 wherein the molten thermoplastic feed material comprises polyvinyl chloride in an amount of 50% to 100% by weight.

16. A composite decking board comprising:
an upper surface;
a first side surface that is substantially orthogonal to the upper surface;
a second side surface that is substantially orthogonal to the upper surface and that is oppositely disposed from the first side surface;
a lower surface that is located between the first and second side surfaces and that is oppositely disposed from the upper surface, the lower surface, the upper surface and first and second side surfaces collectively forming a rectangular shaped cross section, the first and second side surfaces transitioning to the upper surface and to the lower surface at respective upper corners and respective lower corners, the upper and lower corners each being rounded and having a respective radius,
a centerline located midway between the upper surface and the lower surface, the centerline dividing the cross section into an upper portion and a lower portion; and
a reinforcement filament embedded and encapsulated within a thermoplastic polymer material forming the composite decking board, the reinforcement filament being located only in the lower portion of the composite decking board.

17. The composite decking board of claim 16 wherein the thermoplastic polymer material is polyvinyl chloride in an amount of 50% to 100% by weight.

18. The composite decking board of claim 16 comprising a plurality of reinforcement filaments aligned in parallel with one another along a length of the composite decking board, without winding around one another.

\* \* \* \* \*